United States Patent
Bade et al.

(10) Patent No.: US 10,430,227 B2
(45) Date of Patent: Oct. 1, 2019

(54) FAST INSTANTIATION OF VIRTUAL MACHINES IN DISTRIBUTED COMPUTING SYSTEMS

(71) Applicant: Microsoft Technology Licensing, LLC, Redmond, WA (US)

(72) Inventors: Naresh Bade, Hyderabad (IN); Sangeeth Kumar, Hyderabad (IN); Mehul Vora, Hyderabad (IN); Amit Mittal, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 95 days.

(21) Appl. No.: 15/866,017

(22) Filed: Jan. 9, 2018

(65) Prior Publication Data

US 2019/0213025 A1    Jul. 11, 2019

(51) Int. Cl.
  G06F 15/16    (2006.01)
  G06F 9/455    (2018.01)
  H04L 29/06    (2006.01)
  H04L 29/08    (2006.01)

(52) U.S. Cl.
  CPC ......... G06F 9/45558 (2013.01); H04L 29/06 (2013.01); H04L 29/08072 (2013.01); *G06F 2009/45562* (2013.01); *G06F 2009/45579* (2013.01); *G06F 2009/45583* (2013.01); *G06F 2009/45595* (2013.01)

(58) Field of Classification Search
  CPC ... H04L 29/08072; H04L 29/06; H04L 43/08; H04W 24/02
  USPC ................ 709/203, 220, 224, 226, 228, 232
  See application file for complete search history.

(56) References Cited

U.S. PATENT DOCUMENTS

| | | | | |
|---|---|---|---|---|
| 8,656,018 | B1* | 2/2014 | Keagy | G06F 8/63 709/226 |
| 9,529,636 | B2* | 12/2016 | Oshins | G06F 12/0284 |
| 9,535,767 | B2* | 1/2017 | Oshins | G06F 9/4856 |
| 9,921,866 | B2* | 3/2018 | Ganguli | G06F 9/45558 |
| 2009/0216975 | A1 | 8/2009 | Halperin et al. | |
| 2010/0107163 | A1 | 4/2010 | Lee | |

(Continued)

OTHER PUBLICATIONS

"Hyper-V", Retrieved From <<https://docs.microsoft.com/en-us/previous-versions/windows/it-pro/windows-server-2012-R2-and-2012/mt169373(v=ws.11)>>, Oct. 25, 2016, 5 Pages.

(Continued)

*Primary Examiner* — Khanh Q Dinh
(74) *Attorney, Agent, or Firm* — Liang IP, PLLC

(57) ABSTRACT

A base caching disk and associated methods for facilitating fast instantiation of virtual machines in distributed computing systems are disclosed herein. In one embodiment, a method includes during an instantiation process of a virtual machine on a node in the distributed computing system, determining whether a base caching disk on the node contains a block of data of the image needed for the instantiation process of the virtual machine. The method can also include, in response to determining that the base caching disk does not contain the block of data, retrieving the block of data from the central image store without retrieving the entire image, writing the retrieved block of data to a sector on the base caching disk at the node and subsequently, marking the sector containing the written block of data on the base caching disk as read-only.

20 Claims, 13 Drawing Sheets

(56) References Cited

U.S. PATENT DOCUMENTS

| | | | |
|---|---|---|---|
| 2010/0250868 A1* | 9/2010 | Oshins | G06F 12/0284 |
| | | | 711/154 |
| 2010/0251234 A1* | 9/2010 | Oshins | G06F 9/4856 |
| | | | 718/1 |
| 2011/0320556 A1 | 12/2011 | Reuther | |
| 2014/0317394 A1 | 10/2014 | Buhler et al. | |
| 2014/0359213 A1 | 12/2014 | Messec et al. | |
| 2015/0058520 A1 | 2/2015 | Armstrong et al. | |
| 2015/0378766 A1 | 12/2015 | Beveridge et al. | |
| 2016/0150421 A1* | 5/2016 | Li | H04W 24/02 |
| | | | 370/235 |
| 2017/0068562 A1* | 3/2017 | Oshins | G06F 12/0284 |
| 2017/0075617 A1* | 3/2017 | Oshins | G06F 9/4856 |

OTHER PUBLICATIONS

"International Search Report and Written Opinion Issued in PCT Application No. PCT/US2014/066992", dated Apr. 30, 2019, 13 Pages.

"International Search Report and Written Opinion Issued in PCT Application No. PCT/US19/012004", dated Mar. 25, 2019, 12 Pages.

Zhang, et al., "VMThunder: Fast Provisioning of Large-Scale Virtual Machine Clusters", In Proceedings of the IEEE Transactions on Parallel and Distributed Systems, vol. 25, Issue 12, Dec. 1, 2014, pp. 3328-3338.

\* cited by examiner

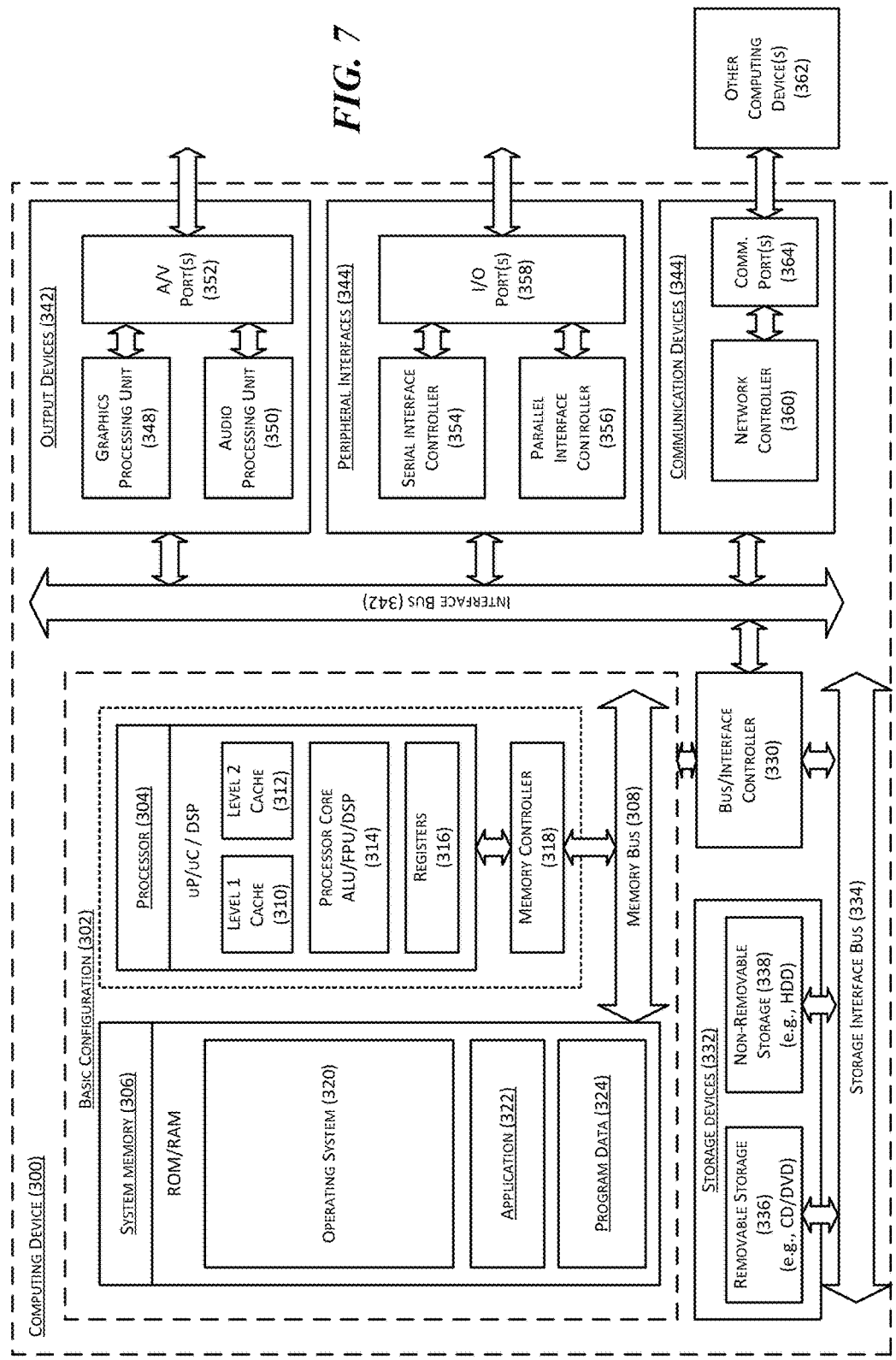

FAST INSTANTIATION OF VIRTUAL MACHINES IN DISTRIBUTED COMPUTING SYSTEMS

BACKGROUND

Cloud computing allows multiple users to access and share pools of configurable computing resources over a computer network. Such shared computing resources can be located in one or more datacenters or other suitable distributed computing systems in which routers, switches, bridges, load balancers, or other network devices interconnect a large number of servers, network storage devices, and other computing devices. Individual servers can host one or more virtual machines, virtual switches, or other types of virtualized functions configured to provide computation, communications, storage, or other suitable types of computing services to users. The provided computing services are commonly referred to as "cloud computing services" or "cloud services."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In computing, a virtual machine generally refers to an emulation of a physical computing system. Virtual machines can be based on certain computer architectures (e.g., x86) and provide functionality of a physical computer. In some distributed computing systems, instantiation of a virtual machine involves allocating compute (e.g., servers or processors), network storage (e.g., persistent data storage), and other suitable types of computing resources to the virtual machine. Instantiation can also involve obtaining digital files or "images" of operating systems, system and/or user applications, and other suitable data from an image store in the distributed computing systems. The one or more allocated servers can then access and execute instructions of the obtained images to provide a suitable computing environment for the virtual machine.

In certain computing systems, allocated network storage to a virtual machine can be surfaced to the virtual machine as a "virtual disk" or "virtual drive." Virtual disks and virtual drives are software components that emulate or "virtualize" one or more actual disk storage devices such as an optical disc drive, a floppy disk drive, or a hard disk drive. In one implementation, a virtual disk can be implemented as a base disk configured to contain a parent image that is read-only and one or more differencing disks configured to contain a set of modified data blocks (maintained in a separate file referred to as the "child image") in relation to the parent image. The differencing disks can allow operations to undo changes. For example, when enabled, all changes to a parent image are stored in one or more child images. Thus, options are available to undo the changes to the parent image, or to merge the parent and child images permanently.

The foregoing implementation of virtual disks or virtual drives can have certain drawbacks. For example, in certain computing systems, when instantiating a virtual machine, an image of operating systems, user application, and other suitable data are first copied from, for instance, a central image store. Subsequently, the one or more servers or processors allocated to the virtual machine can execute suitable instructions contained in the image to instantiate a computing environment for the virtual machine. Thus, when users request to instantiate a large number of virtual machines, retrieving multiple duplicate copies of the image from the central image store can cause significant network traffic congestion resulting in significant instantiation latency. The inventors have observed that instantiation of virtual machines under such example circumstances can take from about five minutes to about twenty-one minutes. Such long delays can negatively impact user experience.

Several embodiments of the disclosed technology can speed up instantiation of virtual machines by implementing a base caching disk coupled to one or more differencing disks for individual virtual machines. The base caching disk can be configured to perform on-demand fetching of one or more sections of data of a needed image instead of waiting for the entire image to be downloaded from the central image store. In one implementation, the central image store is a parent of the base caching disk, which in turn is a parent of the one or more differencing disks. In certain embodiments, a base caching disk can be implemented at a node or server. In other embodiments, additional base caching disks can also be implemented at one or more levels of clusters of nodes or servers.

In certain embodiments, a base caching disk can be implemented as a virtual disk that can be written to only once for each sector. After a first write, the written to sector of the base caching disk becomes read-only. For example, in one implementation, virtual machines can be associated with a base caching disk that is a parent of one or more corresponding differencing disks on a node, such as a physical server. During instantiation, a processor or suitable software components of the node can request a block of data to be executed to provide the virtual machines from the corresponding differencing disks. If the differencing disks contain the requested block of data, the differencing disks can provide such data to the processor without contacting the base caching disk. If the differencing disks do not contain the requested block of data, the differencing disks can individually request the base caching disk for the block of data.

During an initial operation, the base caching disk also may not contain the requested block of data. In response, the base caching disk can request the central image store for only the block of data. Once retrieved, the base caching disk can write the retrieved block of data in a sector on the base caching disk and mark the written sector as read-only. The base caching disk can then provide the block of data to the processor via the differencing disks for all virtual machines to be instantiated on the node. As such, instead of requesting and downloading multiple copies of the block of data, only one copy would be sufficient to continue the instantiation operations.

As additional sectors are retrieved and written to the base caching disk in response to processor requests and/or via background processing at the base caching disk, the base caching disk would eventually contain the entire image. Upon completion of writing the entire image to the base caching disk, the central image store can be removed as a parent of the base caching disk. Subsequently, when additional virtual machines on the same node also request certain blocks of data in the image, the base caching disk can serve the blocks of data without re-fetching the data from the central image store. As such, the image for instantiating the virtual machine can be cached on the base cache disk of the node. Such caching can allow instantiation of additional virtual machines on the same node to avoid latencies associated with accessing the central image store.

Several embodiments of the disclosed technology can thus accelerate instantiation of virtual machines on nodes. Unlike in other computing systems in which a virtual machine is started or "booted" only upon complete retrieval of an image of files needed for the virtual machine, according to the disclosed technology, blocks of data in the image can be retrieved on-demand. For example, retrieval of the image is limited to only sector(s) of data that is to be immediately processed by the processor. Thus, the virtual machine can be booted quickly without waiting for the complete retrieval of the entire image.

Several embodiments of the disclosed technology can also be configured to reduce a load on the central image store by reducing a number of retrieval requests to the central image store for images of virtual machines. Instead of requesting multiple copies of the image for multiple virtual machines to be instantiated on a single node, only one copy would be downloaded from the central image store. Also, as an initial virtual machine (or an initial group of virtual machines) is instantiated on a node, the base caching disk can contain the entire image for the virtual machine. As such, subsequent instantiation of additional virtual machines can be served from the base caching disk instead of from the central image store, and further reducing the number of requests to the central image store.

In addition, one or more levels of cluster base caching disks serving multiple nodes can also be implemented to reduce the number of retrieval requests to the central image store even further. For example, a cluster base caching disk can be configured as a parent for multiple base caching disks on corresponding nodes. As such, instead of multiple requests to the central image store from multiple base caching disks at multiple nodes, only one request from the cluster base caching disk for retrieving blocks of data would be transmitted to the central image store. As a result, latencies associated with retrieving data of image from the central image store can be significantly reduced when compared to downloading individual copies of the image for instantiating each virtual machine.

BRIEF DESCRIPTION OF THE DRAWINGS

FIG. 7 is a computing device suitable for certain components of the distributed computing system in FIG. 1.

DETAILED DESCRIPTION

Figure 1:
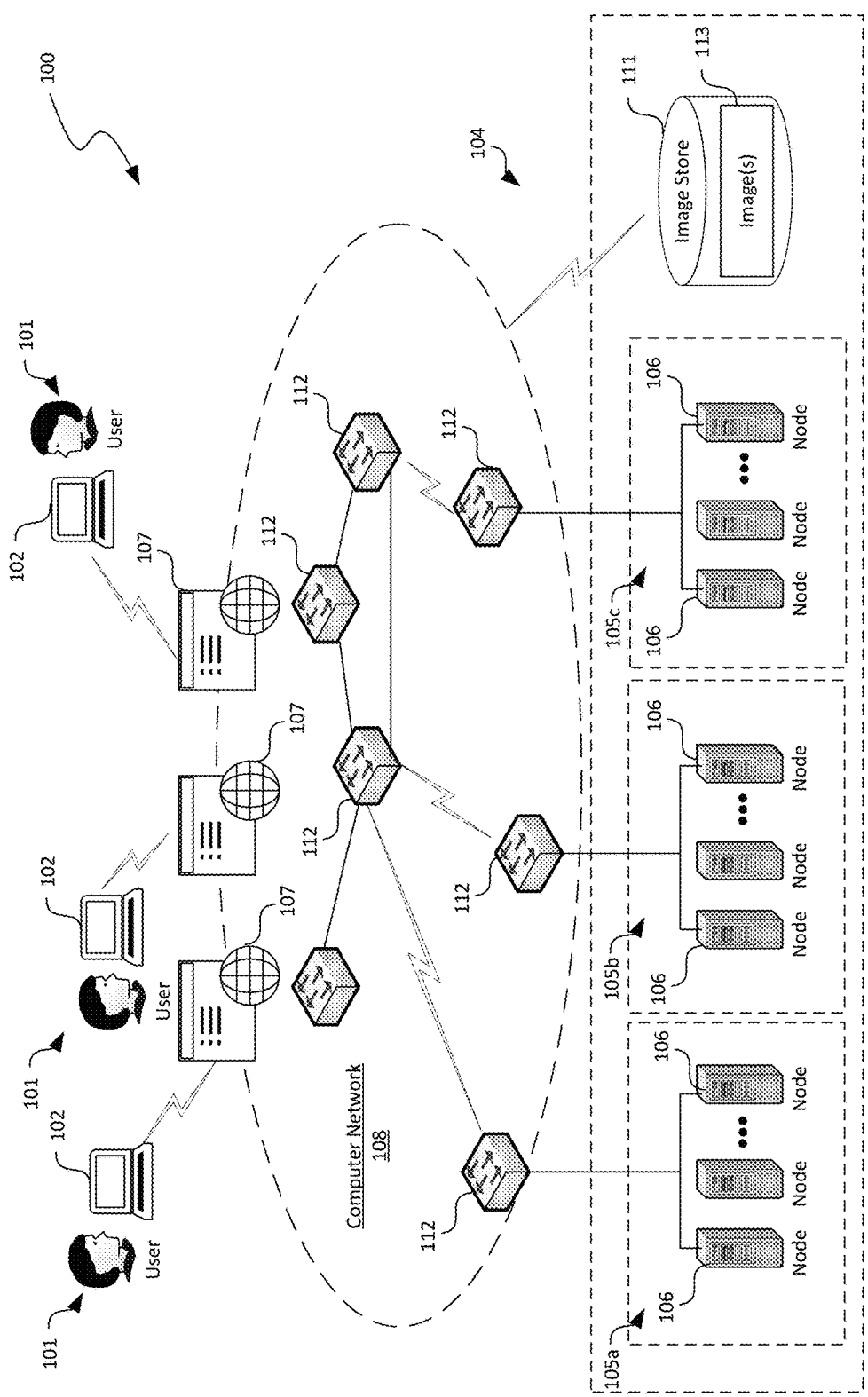
FIG. 1 is a schematic diagram of a distributed computing system configured for fast instantiation of virtual machines in accordance with embodiments of the disclosed technology.

Certain embodiments of computing systems, devices, components, modules, routines, and processes for fast instantiation of virtual machines in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-7.

As used herein, the term "computing cluster" generally refers to a computing system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. In one example, a node can include a computing server having a hypervisor configured to support one or more virtual machines.

As used herein, the term "instantiation" generally refers to generating an instance or occurrence of a computing object that exists during runtime of a computer program. Instantiation binds logical requirements for resources such as memory, processor, and networking access used by, for example, a virtual machine to concrete instances of appropriate resources in a distributed computing system. For example, instantiation of a virtual machine includes, inter alia, allocating appropriate compute, storage, network, and other suitable resources from a pool of resources in a distributed computing system, obtaining images of operating systems, user applications, or other suitable types of data, and executing suitable instructions contained in the obtained images to generate a computing environment that emulates a physical computer.

Also used herein, the term "cloud service" generally refers to one or more computing resources provided over a computer network, such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, the phrase "central image store" generally refers to a network storage space containing files or file images that are accessible by various nodes of a distributed computing system. In certain implementations, a central image store can include a network accessible database hosted on one or more nodes in a distributed computing system. Entries of the database can contain various suitable types of files or file images. Also used herein, a "file," "file image" or "image" generally refers to a collection of digital data that can be stored in a computer storage device. For example, a file image can include a complete copy of an operating system, user applications, user data, or other suitable types of data for a virtual machine. A file image can be logically divided into blocks, sections, or other suitable subdivisions of data. For example, a file image can be logically divided into blocks of 256 Kilobytes, 512 Kilobytes, or other suitable sizes. Each blocks of data may be recorded, written, or stored in a sector, partition, or other suitable divisions of a computer storage device.

Further used herein, a "virtual disk" or "virtual drive" generally refers to one or more software components that emulate an actual and physical disk storage device, such as an optical disc drive, a floppy disk drive, or a hard disk drive. To other programs, a virtual disk behaves like an actual physical device. A virtual disk can be implemented as a disk image that contains data structures of an actual storage device. In accordance with embodiments of the disclosed technology, a virtual disk can include one or more differencing disks coupled to a base caching disk that is a parent to the one or more differencing disks. A "differencing disk" is a virtual disk that contains blocks of data that represent changes to a parent virtual disk, such as a base caching disk. A "base caching disk" or "BCD" is a virtual disk whose sectors can be written only once. Upon completion of a first write to a sector, the sector of the base caching disk is marked as read-only. In contrast, a "base disk" is a virtual disk that is read-only and cannot be written to at all.

In certain computing systems, implementation of virtual disks or virtual drives can have result in significant latency when accessing a central image store. For example, when instantiating multiple virtual machines, an image of an operating systems, one or more user applications, and other suitable data are first copied from the central image store and stored in a virtual disk corresponding to each of the virtual machines. Subsequently, one or more servers or processors allocated to the virtual machines can execute suitable instructions contained in the image to instantiate a computing environment for the virtual machines. As such, multiple duplicate copies of the image are retrieved from the central image store. Such large amount of data retrieval can cause significant network traffic congestion resulting in significant latency when accessing the central image store. Such long delays can negatively impact user experience.

Several embodiments of the disclosed technology can reduce such latency by implementing a virtual disk for each virtual machine that include a base caching disk coupled to one or more differencing disks. The base caching disk can be configured to perform on-demand fetching of one or more sections of data of a needed image instead of waiting for the entire image to be downloaded from the central image store. In one implementation, the central image store is a parent of the base caching disk, which in turn is a parent of the one or more differencing disks. Multiple virtual machines on a single node or a single cluster of nodes can share a base caching disk. As such, a number of copies of the image retrieved from the central image store can be significantly lowered to reduce latency of accessing the central image store, as described in more detail below with reference to FIGS. 1-7.

FIG. 1 is a schematic diagram of a distributed computing system 100 configured for fast instantiation of virtual machines in accordance with embodiments of the disclosed technology. As shown in FIG. 1, the distributed computing system 100 can include a computer network 108 interconnecting a plurality of users 101 via client devices 102 and a computing fabric 104. Even though particular components of the distributed computing system 100 are shown in FIG. 1, in other embodiments, the distributed computing system 100 can also include additional and/or different constituents. For example, the distributed computing system 100 can include additional computing fabrics, network storage devices, utility infrastructures, and/or other suitable components.

The client devices 102 can each include a computing device that facilitates corresponding users 101 to access cloud services provided by the computing fabric 104 via the computer network 108. For example, in the illustrated embodiment, the client devices 102 individually include a desktop computer. In other embodiments, the client devices 102 can also include laptop computers, tablet computers, smartphones, or other suitable computing devices. Even though three users 101 and corresponding client devices 102 are shown in FIG. 1 for illustration purposes, in other embodiments, the distributed computing system 100 can facilitate any suitable number of users 101 to access computing services provided by the computing fabric 104.

As shown in FIG. 1, the computer network 108 can include one or more network devices 112 that interconnect the users 101 and components of the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. In one embodiment, the computer network 108 includes the Internet. In other embodiments, the computer network 108 can also include a local area network, a wide area network, a virtual private network, or other suitable types of computer network.

Also shown in FIG. 1, the computing fabric 104 can include an image store 111 and a plurality of nodes 106 operatively coupled to one another by the network devices 112. In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Figure 2A:
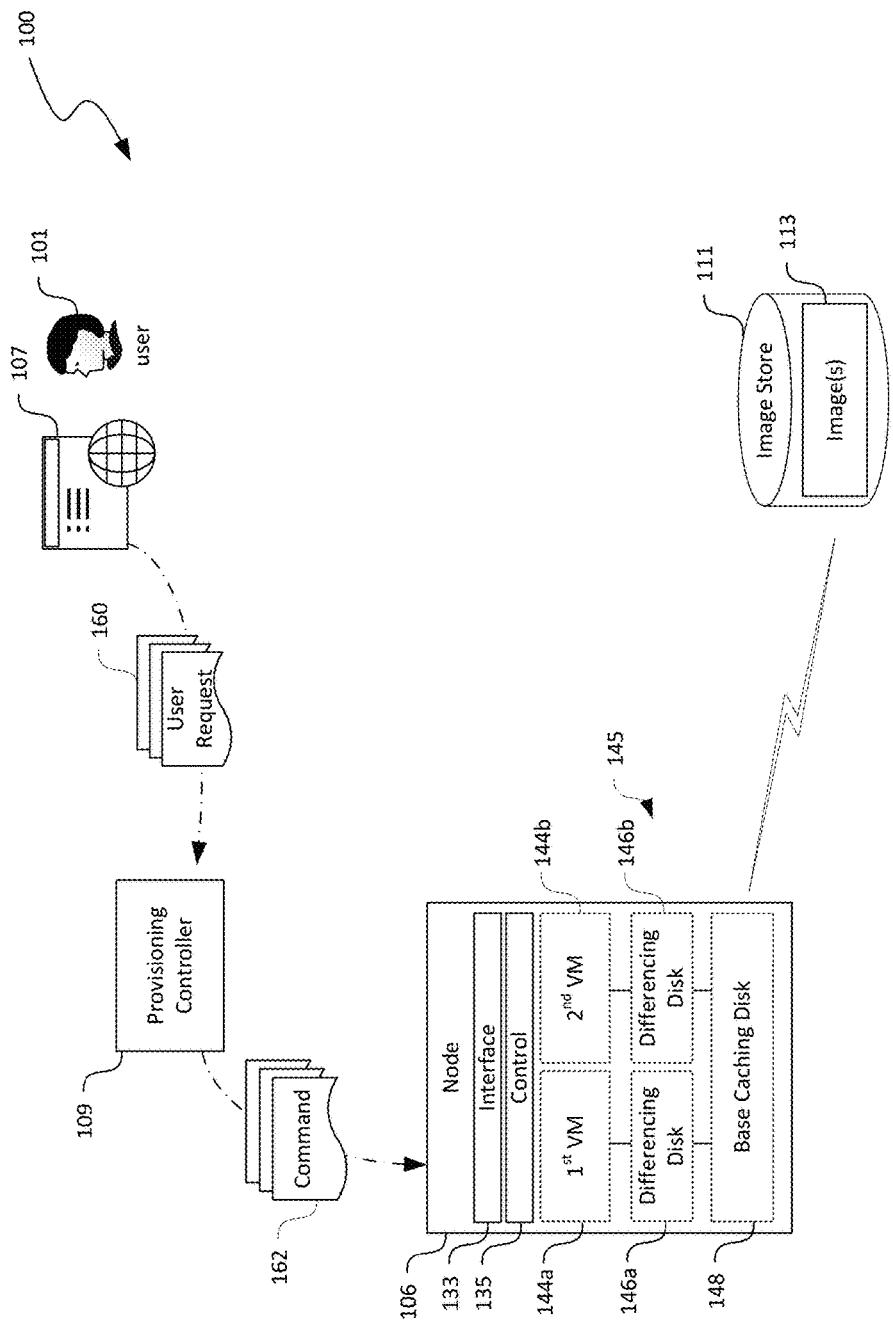
FIGS. 2A-2B are schematic diagrams illustrating certain hardware/software components of the distributed computing system in FIG. 1 in accordance with embodiments of the disclosed technology.
Figure 2B:
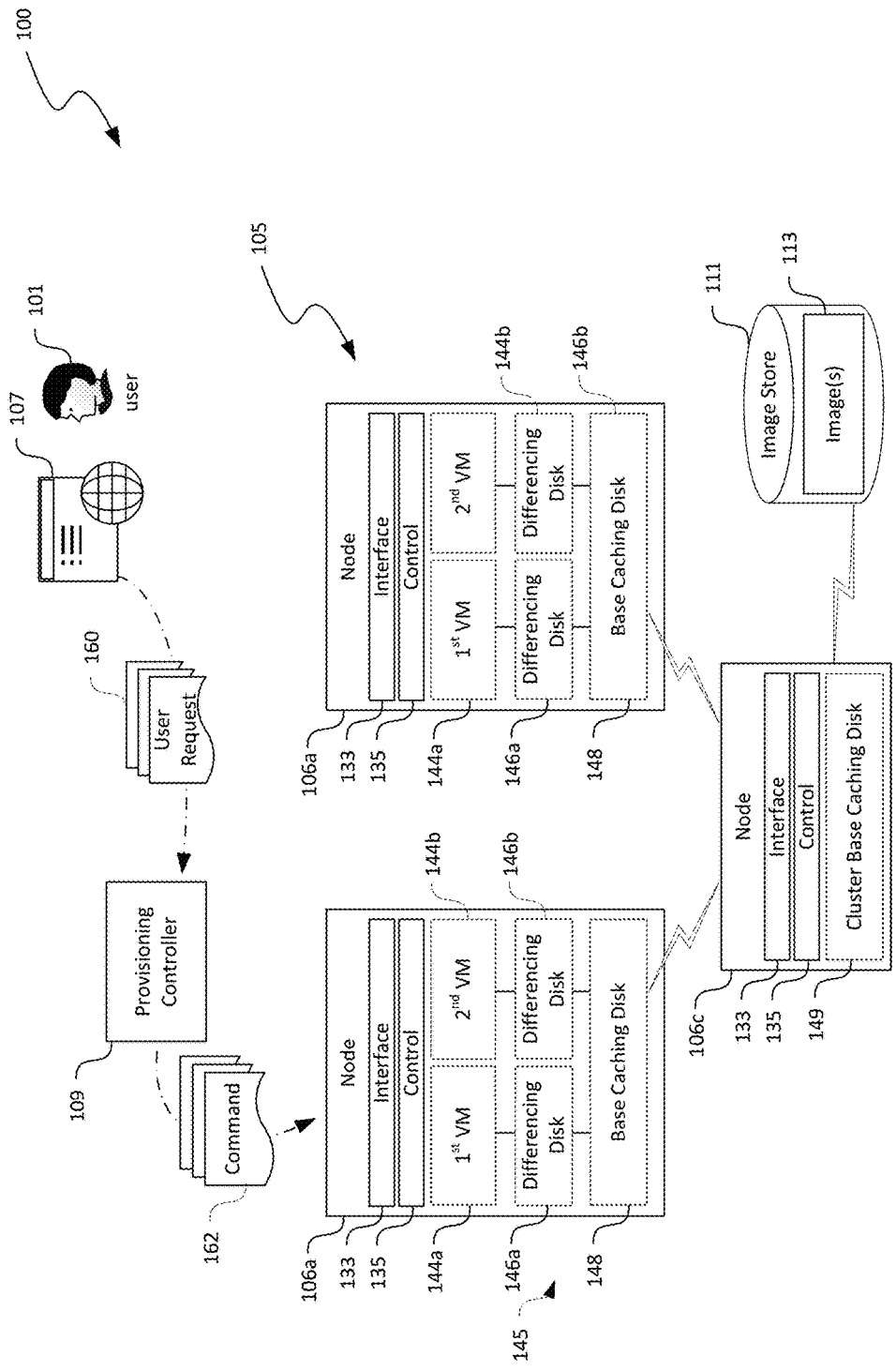

The image store 111 can be configured to contain copies of file and/or disk image 113 suitable for instantiating one or more virtual machines or "VM" 144 (shown in FIGS. 2A and 2B). For example, the individual image 113 can include a complete copy of an operating system, such as Windows® or Linux®. In another example, the image 113 can also include one or more user applications, resource files, or other suitable types of data suitable for instantiating a virtual machine 144. Even though the image store 111 is shown in FIG. 1 as a single database, in other embodiments, the image store 111 can also be implemented as a distributed database hosted on multiple nodes 106.

In operation, the users 101 can request the computing fabric 104 to instantiate one or more virtual machines 144 by, for example, submitting requests via user portals 107 using the client devices 102. In response, the computing fabric 104 can authenticate the user requests and upon authentication, allocating suitable compute (e.g., one or more nodes 106), storage, network, or other suitable types of computing resources. The computing fabric 104, via, for example, a fabric controller (not shown) can then instruct the allocated nodes 106 to instantiate the requested virtual machines 144. As discussed in more detail below with reference to FIGS. 2A-2B, the nodes 106 and/or the computing clusters 105 can be configured to implement one or more base caching disks 148 (shown in FIGS. 2A and 2B) for reducing a latency of accessing copies of the image 113 from the image store 111.

FIGS. 2A and 2B are schematic diagrams illustrating certain hardware/software components of the distributed computing system 100 in FIG. 1 in accordance with embodiments of the disclosed technology. In FIGS. 2A and 2B, certain components of the distributed computing system 100 are omitted for clarity. For example, only one node 106 is shown in FIG. 2A and only one computing cluster 105 is shown in FIG. 2B for illustration purposes. In other embodiments, distributed computing system 100 can include any suitable numbers of nodes 106 and/or computing clusters 105.

In addition, in FIGS. 2A and 2B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the user 101 can access the user portal 107 provided by a corresponding client device 102 for transmitting a user request 160 requesting a virtual machine 144 be instantiated in the distributed computing system 100. The user request 160 can include a name, a template, a list of one or more specified features, a location, or other suitable information related to the virtual machine 144. In other embodiments, the user 101 can also provide display configurations, credentials, execution configurations, subscription information, or other suitable data via the user portal 107. In further embodiments, a developer, administrator, or other suitable types of entity can provide the configurations, and/or other suitable information in lieu of or in addition to the user 101.

Also shown in FIG. 2A, a provisioning controller 109 (e.g., a fabric controller or a component thereof) can receive the user request 160, identify the user request 160 as a request for a virtual machine 144 based on information included in the user request 160 and allocate, for example, the node 106 for instantiating the requested virtual machine 144. Subsequently, the provisioning controller 109 or other suitable components of the distributed computing system 100 can transmit a command 162 to the allocated node 106 for initialize an instantiation process for providing the requested virtual machine 144.

As shown in FIG. 2A, the node 106 can include an interface component 133 and a control component 135 for managing operations of virtual disks on the node 106. The interface component 133 can be configured to receive the command 162, analyze content of the command 162, and forward results of analysis to the control component 135. For example, the interface component 133 can indicate to the control component 135 a type (e.g., differencing, base, base caching, etc.), size (e.g., fixed or dynamic), or other suitable information related to virtual disks 145 associated with the virtual machines 144. In turn, the control component 135 can configure and facilitate operations of the virtual disks 145, such as those described below with reference to FIGS. 3A-4D, as indicated by the interface component 133. In the illustrated example, two virtual machines 144 with corresponding virtual disks 145 are shown for illustration purposes. In other examples, the node 106 can support one, three, four, or any suitable number of virtual machines 144 with corresponding virtual disks 145.

As shown in FIG. 2A, the first virtual machine 144a can be associated with a virtual disk 145 that includes a first differencing disk 146a coupled to a base caching disk 148. The second virtual machine 144b can be associated with another virtual disk 145 that includes a second differencing disk 146b coupled to the same base caching disk 148. The base caching disk 148 is thus a parent to both the first and second differencing disks 146a and 146b while the image 113 in the image store 111 is a parent of the base caching disk 148. As such, the image 113 in the image store 111 can act as a base disk for the base caching disk 148. The base caching disk 148 can be configured to retrieve blocks of data needed for instantiating the first and second virtual machines 144a and 144b in an on-demand fashion, and thus speed up the instantiation process. Details of operations of the base caching disk 148 and the differencing disks 146a and 146b are described in more detail below with reference to FIGS. 3A-3F.

Even though FIG. 2A illustrates the base caching disk 148 as implemented on a single node 106, in other embodiments, the distributed computing disk 148 can also implement a cluster base caching disk 149, for example, on a third node 106c, as shown in FIG. 2B. As shown in FIG. 2B, the computing cluster 105 can include a first node 106a and a second node 106b each supporting a first virtual machine 144a and a second virtual machine 144b. Similar to the configuration shown in FIG. 2A, each of the first and second nodes 106a and 106b can implement a base caching disk 148 that is a parent to the first and second differencing disks 146a and 146b. Unlike the configuration in FIG. 2A though, the computing cluster 105 can also implement a cluster base caching disk 149 that is a parent to both the base caching disks 148 on the first and second nodes 106. In turn, the image 113 at the image store 111 is a parent to the cluster base caching disk 149. Details of operations of the cluster base caching disk 149 and the base caching disks 148 are described in more detail below with reference to FIGS. 4A-4D.

Figure 3A:
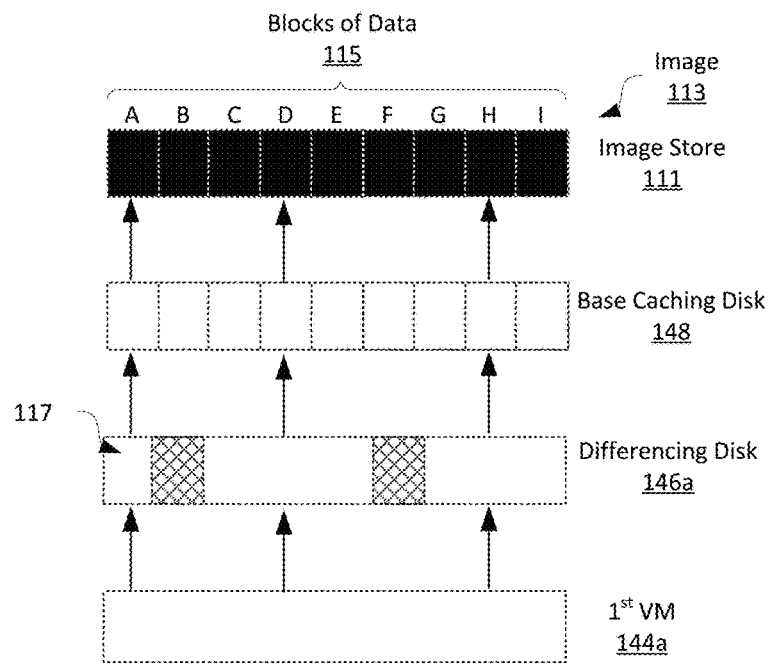
FIGS. 3A-3F are schematic diagrams illustrating various operation stages of a base caching disk on a node during instantiation of virtual machines in accordance with embodiments of the disclosed technology.

FIGS. 3A-3F are schematic diagrams illustrating various operation stages of a base caching disk 148 on a node 106 during instantiation of virtual machines 144 in accordance with embodiments of the disclosed technology. As shown in FIG. 3A, the image 113 in the image store 111 can include multiple blocks of data 115. In the illustrated example, nine blocks 115, identified as block A-I, are shown for illustration purposes. In other embodiments, the image 113 can include any suitable number of blocks 115. Also shown in FIG. 3A, the first differencing disk 146a may contain certain blocks of data 117 unique to the first virtual machine 144a, for example, written to the first differencing disk 146a by the first virtual machine 144a. Such blocks of data 117 can represent a difference between corresponding blocks 115 on the base caching disk 148 and the first virtual machine 144a.

As shown in FIG. 3A, during an initial operation, a processor (not shown) or a suitable software component (e.g., a hypervisor, not shown) on the node 106 can determine that certain blocks of data 115 are now needed for the instantiation processor. In the illustrated example, blocks A, D, and H are indicated as needed. As such, the processor or the software component requests the control component 135 (FIG. 2A) to provide data from blocks A, D, and H. The control component 135 can then determine whether the first differencing disk 146a contains such data. In response to determining that the first differencing disk 146a does not contain such data, the control component 135 can determine whether the base caching disk 148 contains such data. As shown in FIG. 3A, the base caching disk 148 also does not contain such data. In response, the control component 135 can access the image store 111 for retrieving data of blocks A, D, and H without downloading the entire image 113 by, for example, transmitting request for and receive data from the image store 111.

Figure 3B:
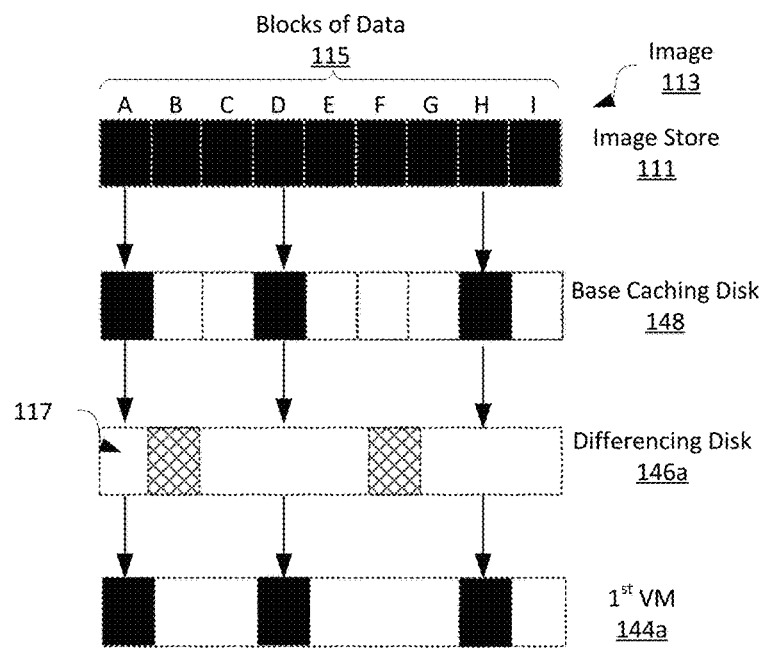
Figure 3C:
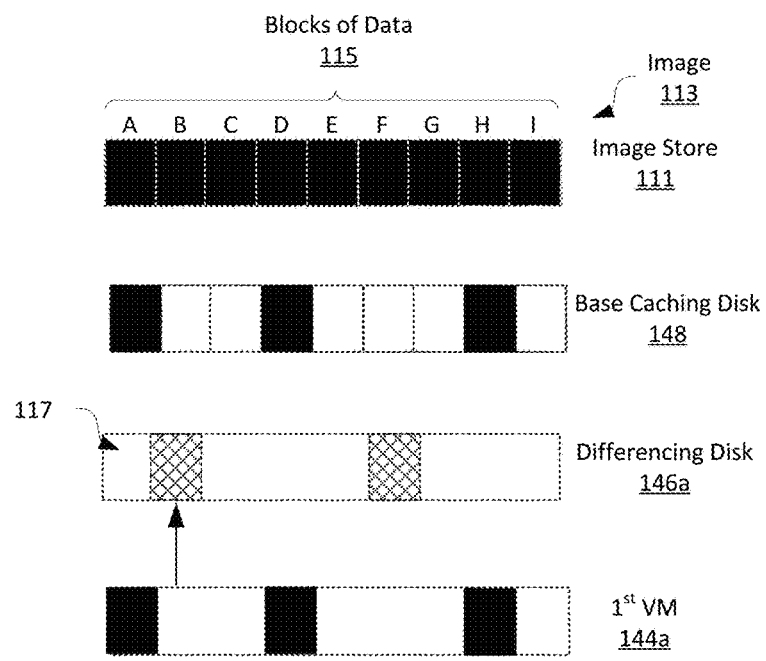
Figure 3D:
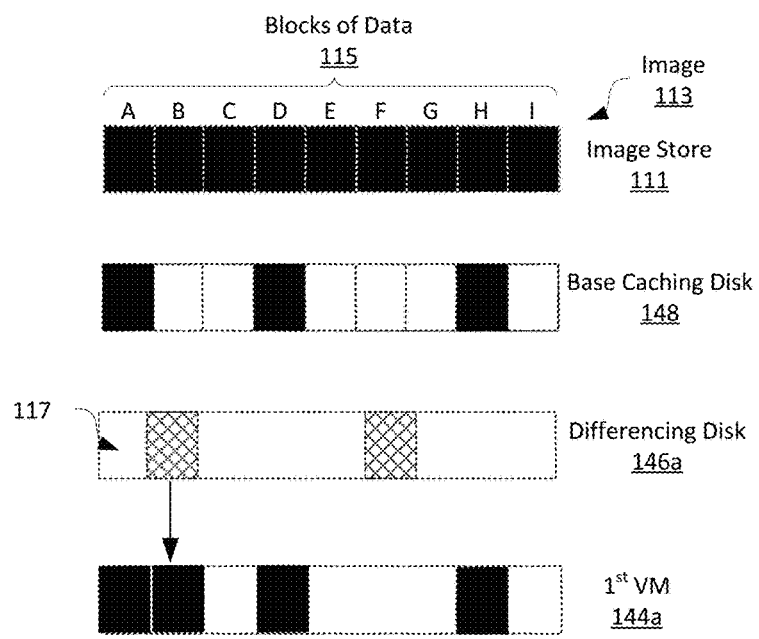

As shown in FIG. 3B, once received the data from blocks A, D, and H, the control component 135 can cause the received data to be written into corresponding sectors in the base caching disk 148 and upon completion of the writes, mark the sectors corresponding to blocks A, D, and H as read-only. The control component 135 can then provide a copy of the received data from either the image store 111 or the base caching disk 148 to the processor or software component supporting the virtual machine 144 via the first differencing disk 146a. Subsequently, the processor or software component can determine that data from block B is now needed for the instantiation process. As shown in FIG. 3C, the control component 135 can determine whether the first differencing disk 146a contains such data. As shown in FIG. 3D, in response to determining that the first differencing disk 146a contains such data, the control component 135 provides the data of block B from the first differencing disk 146a to the processor or software component.

Figure 3E:
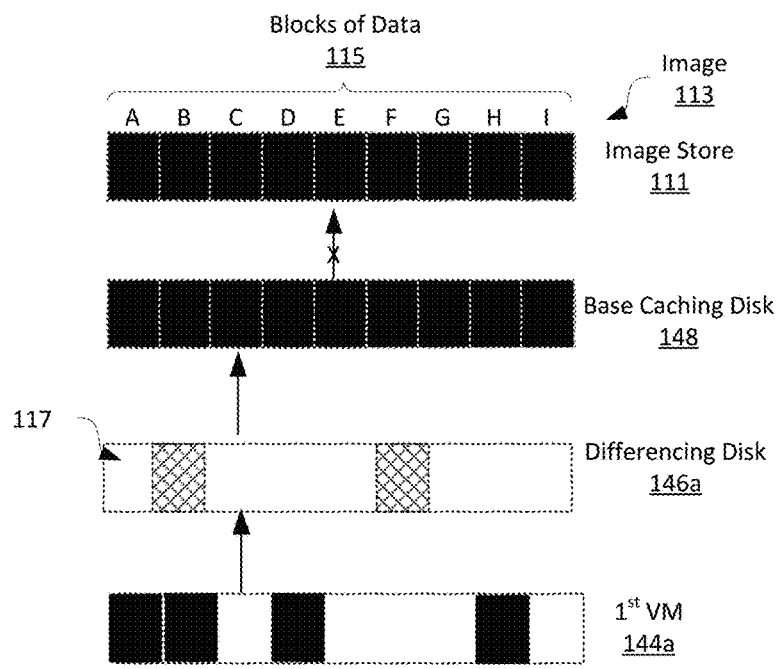
Figure 3F:
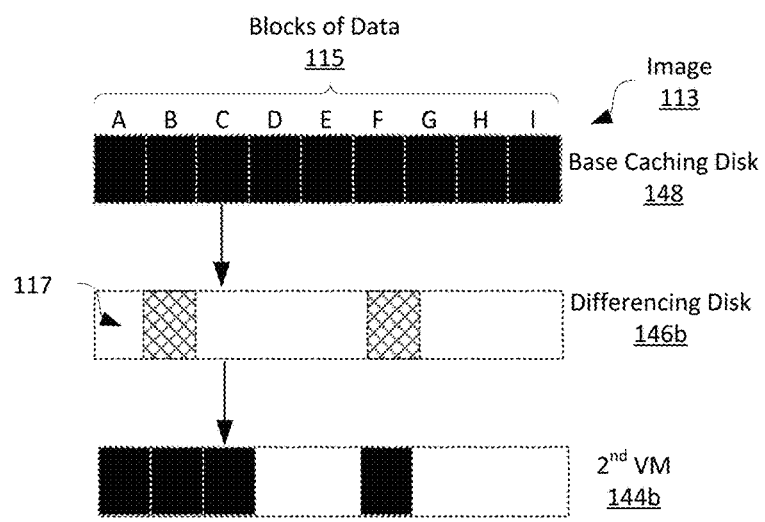

As the processor or software component requests more and more additional data from other blocks 115 of the image 113, or via background processing at the node 106, additional blocks of data 115 can be written into corresponding sectors of the base caching disk 148 and be marked as read-only. As shown in FIG. 3E, in certain embodiments, once a complete copy of the image 113 has been written into the base caching disk 148, the control component 135 can remove the image 113 at the image store 111 as a parent for the base caching disk 148. Subsequent requests for blocks of data 115, for example, for the second virtual machine 144b can be served from the base caching disk 148 without accessing the image store 111, as shown in FIG. 3F. As such, a number of requests for data to the image store 111 can be reduced to one copy from the node 106. In other embodiments, the control component 135 can also maintain the parent-child relationship between the image 113 and the base caching disk 148. In such embodiments, where disk space on the base caching disk 148 is limited, the control component 135 can invalidate and delete one or more written blocks on the base caching disk 148 and hence shrinking the base caching disk. Subsequently, when requests are received at the base caching disk 148 for a block of data that has been deleted, the control component 135 can process the requests by repeating the operations discussed above with reference to FIGS. 3A and 3B.

FIGS. 4A-4D are schematic diagrams illustrating various operation stages of a cluster base caching disk 149, for example, hosted on the third node 106c shown in FIG. 2B, and multiple base caching disks 148 on individual nodes 106 (e.g., first and second nodes 106a and 106b in FIG. 2B) during instantiation of virtual machines 144 in accordance with embodiments of the disclosed technology. Even though only two nodes 106a and 106b are shown in FIGS. 4A-4D, in other embodiments, similar operations can be implemented for any suitable number of nodes 106.

Figure 4A:
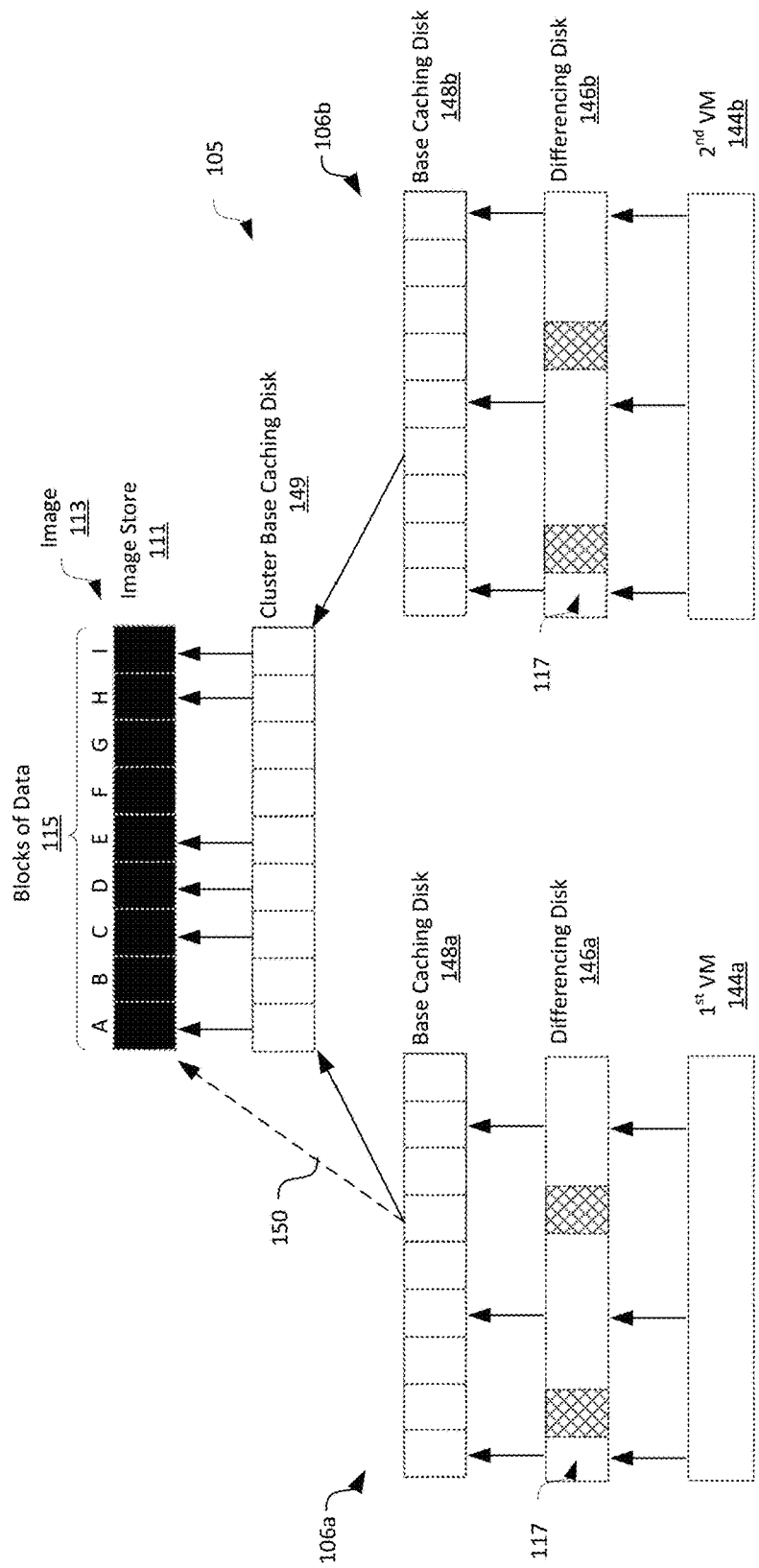
FIGS. 4A-4D are schematic diagrams illustrating various operation stages of a cluster base caching disk and multiple base caching disks on individual nodes during instantiation of virtual machines in accordance with embodiments of the disclosed technology.

As shown in FIG. 4A, a processor or software component on the first and second nodes 106a and 106b can each request certain blocks of data 115 during an initial stage of the instantiation process. For example, as shown in FIG. 4A, blocks A, D, and H are requested at the first node 106a while blocks A, E, and I are requested at the second node 106b. Similar to the operations in FIGS. 3A and 3B, in response to determining that the first and second differencing disks 146a and 146b do not contain the requested data, the control component (FIG. 2B) can determine whether the first and second base caching disks 148a and 148b at the first and second nodes 106a and 106b, respectively, contain such data.

In response to determining that the first and second base caching disks 148a and 148b do not contain such data, in certain embodiments, the control component 135 can determine whether the cluster base caching disk 149 contains such data. In response to determine that the cluster base caching disk 149 also does not contain such data, the control component 135 on, for example, the third node 106c in FIG.

2B, can request a single copy of the needed data from the image store 111. For instance, in the illustrated example, a single copy of blocks A, D, D, E, H, and I are requested and retrieved from the image store instead of multiple copies of such data. Thus, a demand on bandwidth to the image store can be reduced. Upon receiving the requested data from the image store 111, the control component 135 can cause the data to be written into suitable sectors in the cluster base caching disk 149 and serve request for such data to the cluster base caching disk 149.

In other embodiments, in response to determining that the first and second base caching disks 148a and 148b do not contain such data, the control component 135 can also request both the image store 111 and the cluster base caching disk 149 for retrieving the needed blocks of data 115, as indicated by the dash arrow 150. The control component 135 can subsequently utilize a copy from either the image store 111 or the cluster base caching disk 149 depending on which copy was retrieved successfully first.

Figure 4B:
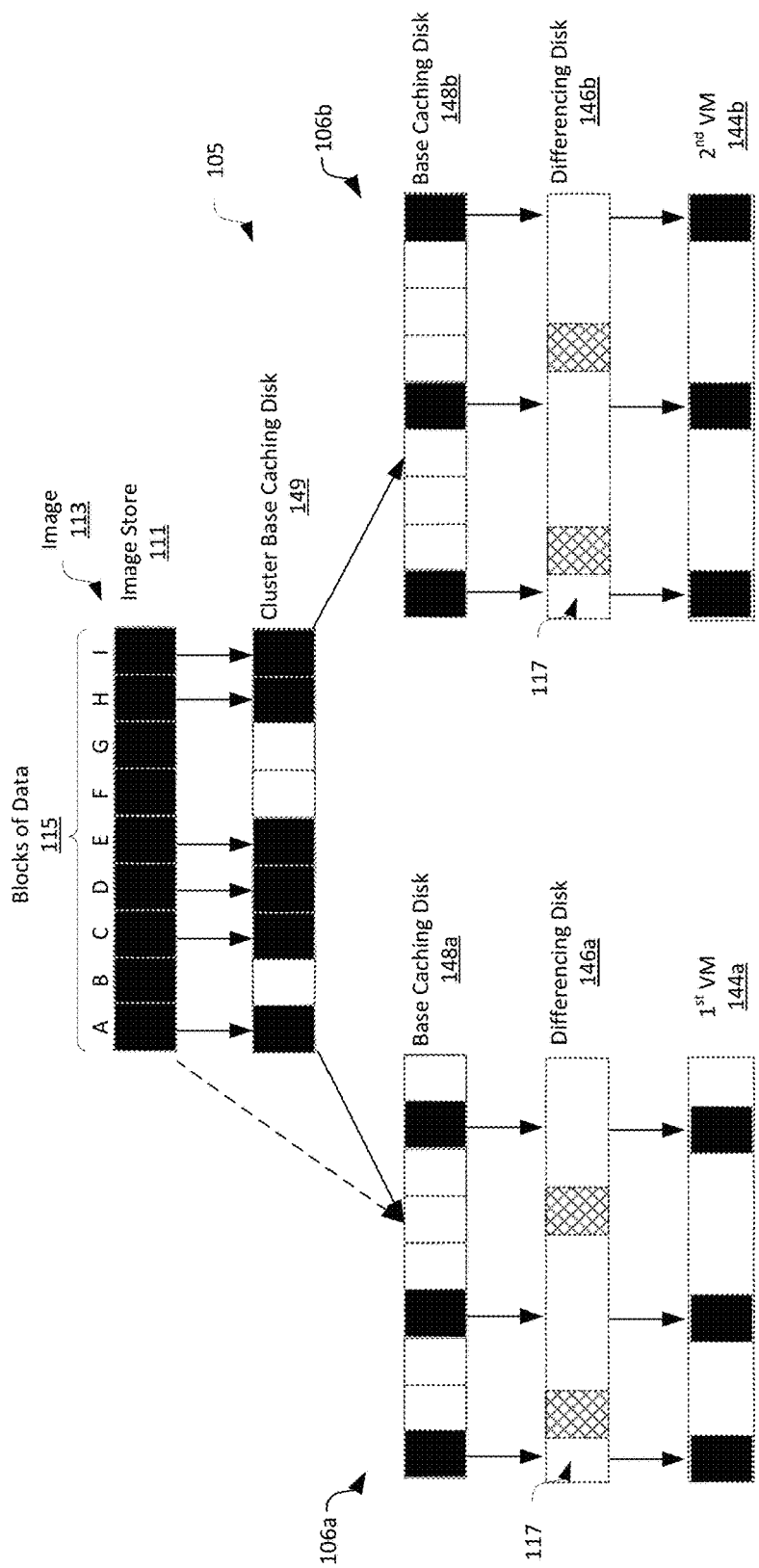

As shown in FIG. 4B, the image store 111 can provide the request copy of blocks of data 115 to the cluster base caching disk 149 to be stored in corresponding sectors. The written to sectors are then marked as read-only. The cluster based caching disk 149 can then make available a copy of the requested blocks of data 115 to the first and second base caching disk 148a and 148b. For instance, as shown in FIG. 4B, the first base caching disk 148a can retrieve or pull blocks A, D, and H from the cluster based caching disk 149 to the first base caching disk 148a while the second base caching disk 148b can retrieve or pull blocks A, E, and I to the second base caching disk 148b. The first and second base caching disks 148a and 148b can the store the received blocks of data 115 in corresponding sectors and mark these sectors as read-only before providing the data to the processor or software component for continuing the instantiation process.

Figure 4C:
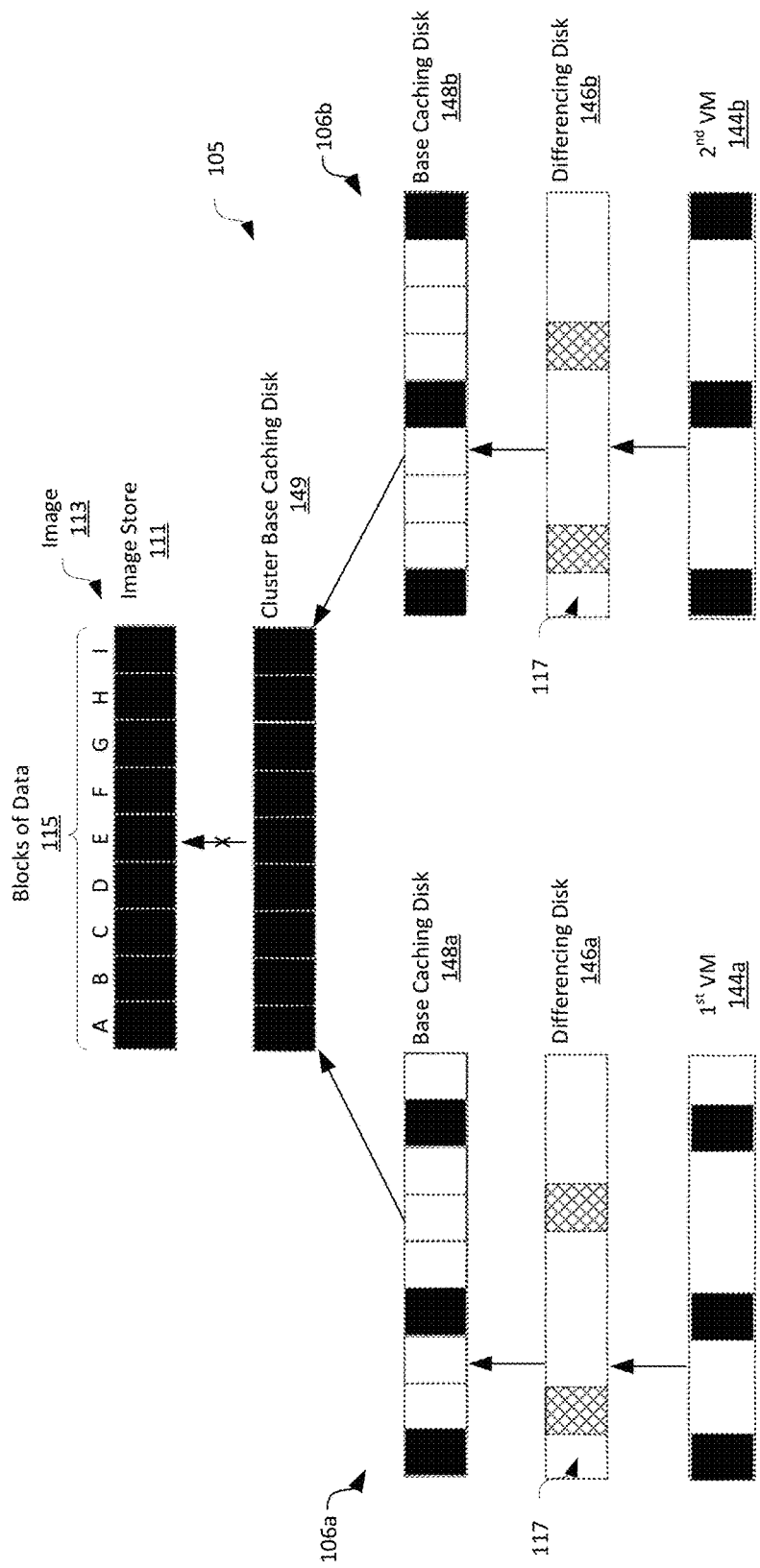

As shown in FIG. 4C, as more blocks of data 115 are requested from the cluster base caching disk 149 and/or via background processing, the cluster base caching disk 149 can eventually contain an entire image 113. Upon determining that the cluster base caching disk 149 contains a complete image 113, the image 113 at the image store 111 can be removed as a parent from the cluster base caching disk 149. Subsequent data requests in the computing cluster 105 can be served from the cluster base caching disk 149 without accessing the image store 111.

Figure 4D:
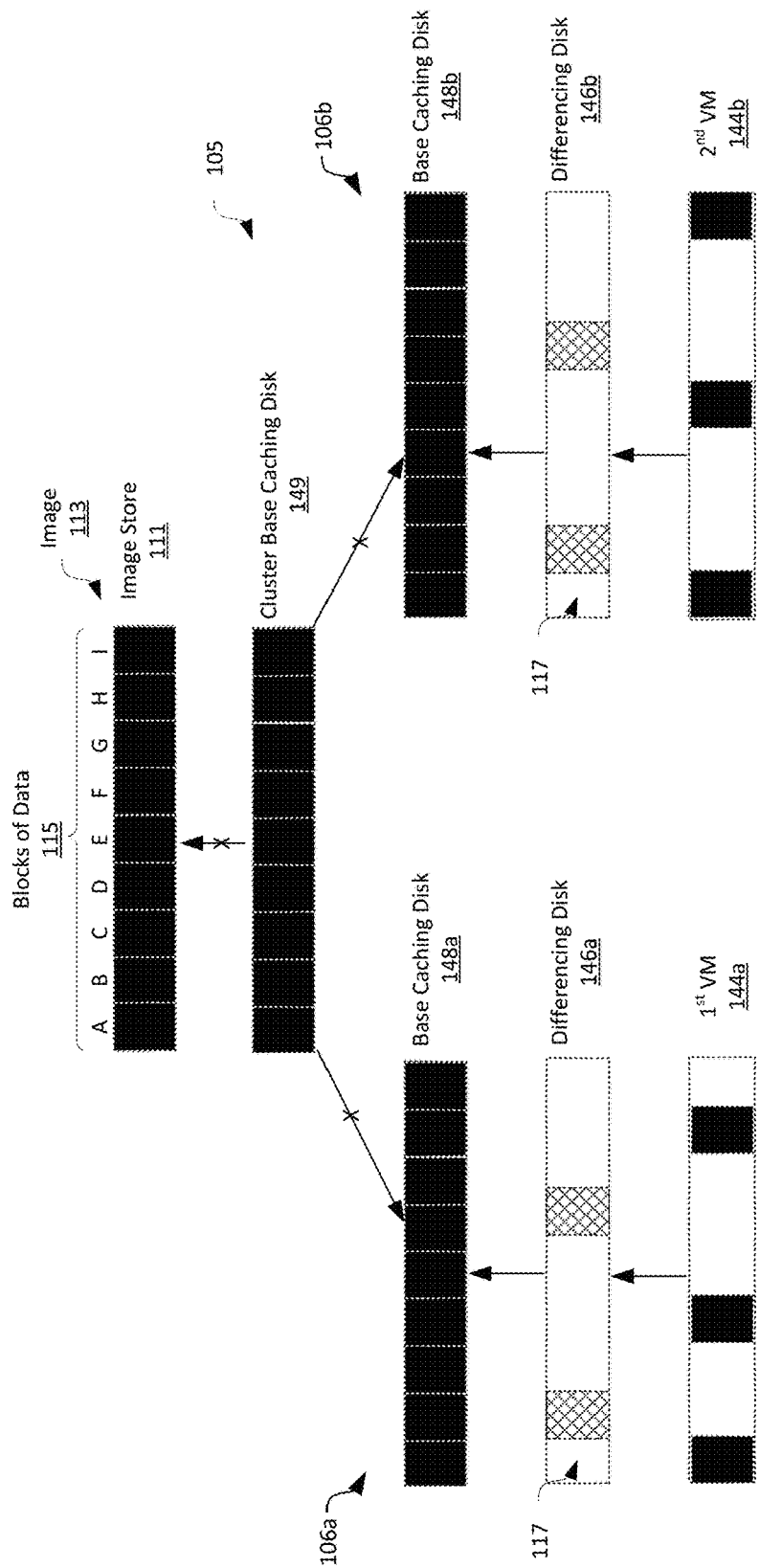

As shown in FIG. 4D, as more blocks of data 115 are requested from the first and second base caching disks 148a and 148b to the cluster base caching disk 149 and/or via background processing, the first and second base caching disks 148a and 148b can eventually contain an entire image 113. Upon determining that the first and second base caching disks 148a and 148b, the cluster base caching disk 149 can be removed as a parent from the first and second base caching disks 148a and 148b. Subsequent data requests in the first and second nodes 106a and 106b can be served from the first and second base caching disks 148a and 148b without accessing either the cluster base caching disk 149 or the image store 111.

Figure 5:
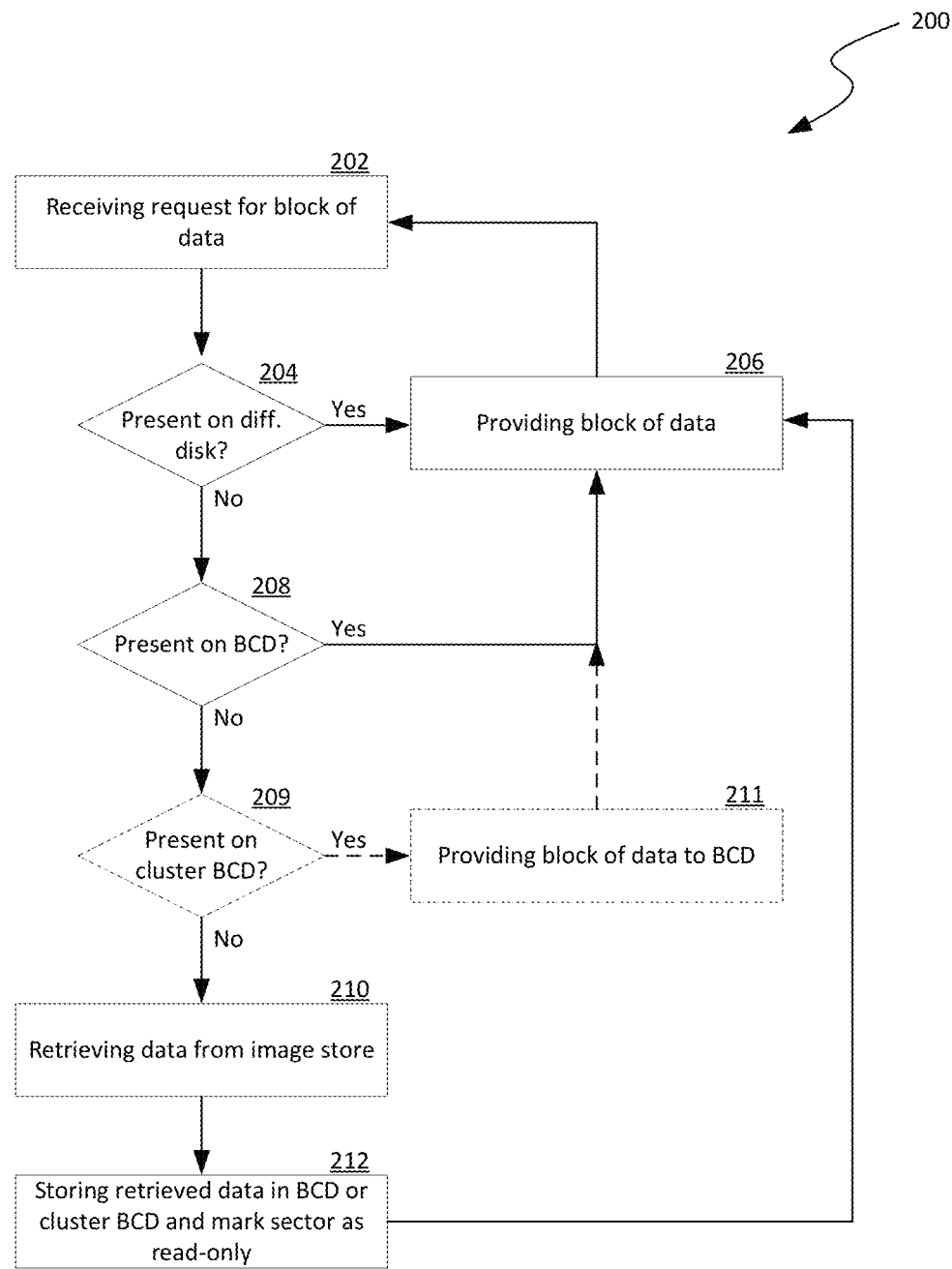
FIGS. 5 and 6 are flowcharts illustrating processes related to fast instantiation of virtual machines in a distributed computing system in accordance with embodiments of the disclosed technology.
Figure 6:
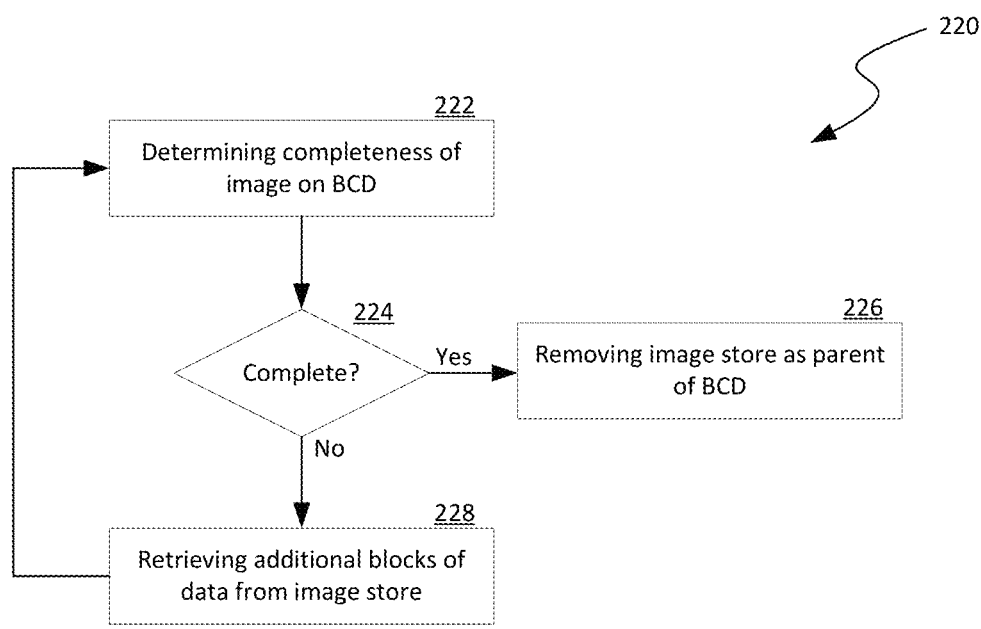

FIGS. 5 and 6 are flowcharts illustrating processes related to fast instantiation of virtual machines in a distributed computing system in accordance with embodiments of the disclosed technology. Though the processes illustrated in FIGS. 5 and 6 are described in relation to the distributed computing system 100 of FIGS. 1-4D, in other embodiments, the processes can also be implemented in computing systems with additional and/or different components.

As shown in FIG. 5, a process 200 for instantiating a virtual machine can include receiving a request for one or more blocks of data at stage 202. The process 200 can then include a decision stage 204 to determine whether the requested block of data is present on a differencing disk associated with the virtual machine. Such determination can be based on file mapping or other suitable meta data of the differencing disk. In response to determining that the differencing disk contains the block of data, the process 200 can include providing the block of data from the block of data from the differencing disk.

In response to determining that the differencing disk does not contain the block of data, the process 200 can include another decision stage 208 to determine whether a base caching disk that is a parent to the differencing disk contains such a block of data. In response to determining that the base caching disk contains the block of data, the process 200 can include providing the block of data from the base caching disk at stage 206. In response to determining that the base caching disk does not contain the block of data, the process 200 can optionally include another decision stage 209 to determine whether a cluster base caching disk that is a parent to the base caching disk contains the block of data. In response to determining that the cluster base caching disk contains the block of data, the process 200 includes providing the data from the cluster base caching disk at stage 206 and providing the data to the base caching disk at stage 211.

In response to determining that the cluster base caching disk or the base cluster disk does not contain the block of data, the process 200 can include retrieving the block of data from a central image store at stage 210. Such retrieval can include querying a database, requesting copies of data blocks, receiving requested data blocks, and/or other suitable operations. The process 200 can then include storing the received block of data in the base caching disk and optionally the cluster base caching disk in corresponding sectors and marking such sectors as read-only thereafter at stage 212 before reverting to providing the block of data at stage 206.

FIG. 6 illustrates a process 220 of managing a base caching disk or cluster base caching disk. For example, as shown in FIG. 6, the process 220 can includes determining a completeness of an image on a base caching disk or cluster base caching disk at stage 222. The process 220 can then include a decision stage to determine whether the image on the base caching disk or cluster base caching disk is complete. In response to determining that the image is complete on the base caching disk or cluster base caching disk, the process 220 can include removing the image store as a parent to the base caching disk or cluster base caching disk at stage 226. Otherwise, the process 220 can include retrieving additional blocks of data either on-demand or via background processing from the image store at stage 228 before reverting to determining a completeness of the image on the base caching disk or cluster base caching disk at stage 222.

FIG. 7 is a computing device 300 suitable for certain components of the distributed computing system 100 in FIG. 1. For example, the computing device 300 can be suitable for the nodes 106 of FIG. 1 or the provisioning controller 109 of FIGS. 2A and 2B. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 4 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated or other types of signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of instantiation of virtual machines on nodes interconnected via a computer network in a distributed computing system having a central image store containing images of an operating system and optionally one or more applications suitable for instantiating virtual machines on the nodes, the method comprising:

during instantiation of a virtual machine on a node in the distributed computing system,
receiving a request for a block of data in an image corresponding to the virtual machine to be instantiated; and
in response to receiving the request for the block of data,
determining whether a base caching disk on the node contains the requested block of data, the base caching disk being shareable by multiple virtual machines on the same node; and
in response to determining that the base caching disk does not contain the requested block of data,
retrieving, via the computer network, the requested block of data from the central image store without retrieving the image in entirety;
writing the retrieved block of data to a sector on the base caching disk at the node;
upon completion of writing the block of data to the sector, marking the sector containing the written block of data as read-only; and providing the retrieved block of data from the caching base disk in response to the request, thereby enabling instantiation of the virtual machine without waiting for retrieving the image in entirety.

2. The method of claim 1 wherein the virtual machine includes a virtual disk having the base caching disk as a parent and a differencing disk as a child of the base caching disk, and wherein the method further includes:
in response to receiving the request for the block of data, determining whether the requested block of data is available at the differencing disk of the virtual machine; and
in response to determining that the requested block of data is not available at the differencing disk, determining whether the base caching disk on the node contains the requested block of data.

3. The method of claim 1 wherein the virtual machine includes a virtual disk having the base caching disk as a parent and a differencing disk as a child of the base caching disk, and wherein the method further includes:
in response to receiving the request for the block of data, determining whether the requested block of data is available at the differencing disk of the virtual machine; and
in response to determining that the requested block of data is available at the differencing disk, providing the block data from the differencing disk in response to the received request without determining whether the base caching disk on the node contains the requested block of data.

4. The method of claim 1 wherein the virtual machine includes a virtual disk having the base caching disk as a parent and a differencing disk as a child of the base caching disk, and wherein the method further includes:
in response to receiving the request for the block of data, determining whether the requested block of data is available at the differencing disk of the virtual machine;
in response to determining that the requested block of data is not available at the differencing disk, determining whether the base caching disk on the node contains the requested block of data; and
in response to determining that the base caching disk contains the requested block of data, providing the block data from the base caching disk in response to the received request without retrieving the block of data from the central image store.

5. The method of claim 1 wherein the virtual machine includes a virtual disk having the base caching disk as a parent and a differencing disk as a child of the base caching disk, and wherein the base caching disk is a child of the central image store, and wherein the method further includes:
repeating retrieving, writing, and marking operations for additional blocks of data via background processing on the node;
determining whether the base caching disk contains the entire image corresponding to the virtual machine; and
in response to determining that the base caching disk contains the entire image corresponding to the virtual machine, removing the central image store as a parent to the base caching disk.

6. The method of claim 1 wherein the virtual machine includes a virtual disk having the base caching disk as a parent and a differencing disk as a child of the base caching disk, and wherein the base caching disk is a child of the central image store, and wherein the method further includes:
determining whether the base caching disk contains the entire image corresponding to the virtual machine;
in response to determining that the base caching disk contains the entire image corresponding to the virtual machine, removing the central image store as a parent to the base caching disk; and
providing blocks data of the image from the base caching disk in response to additional requests for the blocks of data for instantiating additional virtual machines on the node.

7. The method of claim 1 wherein:
the node is a first node;
the virtual machine is a first virtual machine on the first node;
the base caching disk is a first base caching disk on the first node;
the distributed computing system also includes a cluster base caching disk accessible by the first base caching disk and a second base caching disk of a second virtual machine being instantiated on a second node different than the first node, the central image store being a parent to the cluster base caching disk, which is a parent to both the first and second base caching disk on the first and second nodes, respectively; and
the method further includes, in response to determining that the first or second base caching disk does not contain the requested block of data,
determining whether the cluster base caching disk contains the requested block of data;
in response to determining that the cluster base caching disk does not contain the requested block of data,
retrieving, via the computer network, the requested block of data from the central image store without retrieving the image in entirety;
writing the retrieved block of data to a sector on the cluster base caching disk; and
upon completion of writing the block of data to the sector on the cluster base caching disk, marking the sector containing the written block of data on the cluster base caching disk as read-only.

8. The method of claim 7, further comprising:
upon completion of writing the block of data to the sector on the cluster base caching disk,
providing the block of data to the first or second base caching disk;
writing the provided block of data to a sector on the first or second base caching disk at the first or second node, respectively; and
upon completion of writing the block of data to the sector on the first or second base caching disk, marking the sector containing the written block of data on the first or second base caching disk as read-only.

9. The method of claim 7, further comprising:
determining whether the cluster base caching disk contains the entire image corresponding to the first and second virtual machines;
in response to determining that the cluster base caching disk contains the entire image corresponding to the first and second virtual machines, removing the central image store as a parent to the cluster base caching disk.

10. A computing device interconnected with additional computing devices in a distributed computing system via a computer network, the computing device comprising:

a processor; and a memory containing instructions executable by the processor to cause the computing device to:

receiving an instruction to instantiate multiple virtual machines on the computing device; and in response to receiving the instruction, instantiating the multiple virtual machines by:

determining whether a base caching disk on the node contains a block of data in an image of an operating system suitable for instantiating the multiple virtual machines on the computing device, the base caching disk being shared by the multiple virtual machines; and in response to determining that the base caching disk does not contain the requested block of data, retrieving, via the computer network, a single copy of the requested block of data from a central image store in the distributed computing system without retrieving the image in entirety;

writing the retrieved single copy of the requested block of data to a sector on the base caching disk at the computing device;

upon completion of writing the block of data to the sector, marking the sector containing the written block of data on the base caching disk as read-only; and executing, at the processor, the retrieved block of data to facilitate instantiation of the multiple virtual machines.

11. The computing device of claim 10 wherein:

the multiple virtual machines individually includes a virtual disk having the base caching disk as a parent and a corresponding differencing disk as a child of the base caching disk, and wherein the memory contains additional instructions executable by the processor to cause the computing device to:

determining whether the block of data is available at the corresponding differencing disks of the multiple virtual machines; and in response to determining that the requested block of data is not available at the corresponding differencing disks, determining whether the base caching disk on the computing device contains the block of data.

12. The computing device of claim 10 wherein:

the multiple virtual machines individually includes a virtual disk having the base caching disk as a parent and a corresponding differencing disk as a child of the base caching disk, and wherein the memory contains additional instructions executable by the processor to cause the computing device to:

determine whether the block of data is available at the corresponding differencing disks of the multiple virtual machines; and in response to determining that the block of data is available at the corresponding differencing disks, provide the block data from the corresponding differencing disks without determining whether the base caching disk on the computing device contains the block of data.

13. The computing device of claim 10 wherein:

the multiple virtual machines individually includes a virtual disk having the base caching disk as a parent and a corresponding differencing disk as a child of the base caching disk, and wherein the memory contains additional instructions executable by the processor to cause the computing device to:

determine whether the block of data is available at the corresponding differencing disks;

in response to determining that the requested block of data is not available at the corresponding differencing disk, determine whether the base caching disk on the computing device contains the block of data; and in response to determining that the base caching disk contains the block of data, obtain the block data from the base caching disk without retrieving the block of data from the central image store.

14. The computing device of claim 10 wherein:

the multiple virtual machines individually includes a virtual disk having the base caching disk as a parent and a corresponding differencing disk as a child of the base caching disk, and wherein the memory contains additional instructions executable by the processor to cause the computing device to:

determine whether the base caching disk contains the entire image corresponding to the multiple virtual machines; and in response to determining that the base caching disk contains the entire image corresponding to the multiple virtual machines, remove the central image store as a parent to the base caching disk.

15. The computing device of claim 10 wherein:

the multiple virtual machines individually includes a virtual disk having the base caching disk as a parent and a corresponding differencing disk as a child of the base caching disk, and wherein the memory contains additional instructions executable by the processor to cause the computing device to:

determine whether the base caching disk contains the entire image corresponding to the virtual machine;

in response to determining that the base caching disk contains the entire image corresponding to the virtual machine, remove the central image store as a parent to the base caching disk; and obtain additional blocks data of the image from the base caching disk during subsequent operations for instantiating the multiple virtual machines on the computing device.

16. A method of instantiation of virtual machines on nodes interconnected via a computer network in a distributed computing system having a central image store containing an image of an operating system and optionally one or more applications suitable for instantiating virtual machines on the nodes, the method comprising:

during an instantiation process of a virtual machine on a node in the distributed computing system, determining whether a base caching disk on the node contains a block of data of the image needed for the instantiation process of the virtual machine, sectors of the base caching disk being writable only once and read-only thereafter;

in response to determining that the base caching disk contains the block of data, obtaining the block of data from the base caching disk; and in response to determining that the base caching disk does not contain the block of data, retrieving, via the computer network, the block of data from the central image store without retrieving the entire image;

writing the retrieved block of data to a sector on the base caching disk at the node;

subsequently, marking the sector containing the written block of data on the base caching disk as read-only; and applying the obtained block of data to the instantiation process of the virtual machine.

17. The method of claim 16, further comprising:
during an instantiation process of another virtual machine on the same node in the distributed computing system, obtaining the block of data from the read-only sector of the base caching disk; and
applying the obtained block of data to the instantiation process of the another virtual machine.

18. The method of claim 16, further comprising:
the node is a first node;
the virtual machine is a first virtual machine on the first node;
the base caching disk is a first base caching disk on the first node;
the distributed computing system also includes a cluster base caching disk accessible by the first base caching disk and a second base caching disk of a second virtual machine being instantiated on a second node different than the first node, the central image store being a parent to the cluster base caching disk, which is a parent to both the first and second base caching disk on the first and second nodes, respectively; and
the method further includes, in response to determining that the first or second base caching disk does not contain the block of data,
determining whether the cluster base caching disk contains the block of data; and
in response to determining that the cluster base caching disk does not contain the requested block of data,
retrieving, via the computer network, the block of data from the central image store without retrieving the image in entirety;
writing the retrieved block of data to a sector on the cluster base caching disk; and
upon completion of writing the block of data to the sector on the cluster base caching disk, marking the sector containing the written block of data on the cluster base caching disk as read-only.

19. The method of claim 18, further comprising:
determining whether the cluster base caching disk contains the entire image corresponding to the first and second virtual machines; and
in response to determining that the cluster base caching disk contains the entire image corresponding to the first and second virtual machines, removing the central image store as a parent to the cluster base caching disk.

20. The method of claim 18, further comprising:
determining whether the first or second base caching disk contains the entire image corresponding to the first and second virtual machines; and
in response to determining that the first or second cluster base caching disk contains the entire image corresponding to the first and second virtual machines, removing the cluster base caching disk as a parent to the first or second base caching disk on the first or second node, respectively.

* * * * *